United States Patent [19]
Schimkat

[11] 3,782,490
[45] Jan. 1, 1974

[54] STEERING ARRANGEMENT FOR VEHICLES, ESPECIALLY MOTOR VEHICLES, WITH A STEERING SERVO MECHANISM

[75] Inventor: Harald Schimkat, Flechtorf, Germany

[73] Assignee: Volkswagenwerk Aktiengesellschaft, Wolfsburg, Germany

[22] Filed: Aug. 4, 1971

[21] Appl. No.: 168,917

[30] Foreign Application Priority Data
Aug. 27, 1970  Germany............................ 2042428

[52] U.S. Cl. .............................................. 180/79.1
[51] Int. Cl............................................. B62d 5/04
[58] Field of Search ..................... 180/79.2 R, 79.1

[56] References Cited
UNITED STATES PATENTS
3,291,245  12/1966  Hewko............................ 180/79.2 R
3,183,992  5/1965  Brueder.......................... 180/79.2 R
3,011,579  12/1961  Milliken........................ 180/79.2 R
2,987,135  6/1961  Harvey............................ 180/79.2 R Primary Examiner—Kenneth H. Betts
Assistant Examiner—John A. Pekar
Attorney—Ernest F. Marmorek

[57]  ABSTRACT

A steering arrangement for vehicles, especially for motor vehicles comprising a steering gear and a steering servo mechanism, and means coupled between the steering gear and the servo mechanism for superimposing a further translation ratio independent from the velocity of the vehicle to the steering translation ratio of the steering gear without changing the steering momentum.

12 Claims, 3 Drawing Figures

STEERING ARRANGEMENT FOR VEHICLES, ESPECIALLY MOTOR VEHICLES, WITH A STEERING SERVO MECHANISM

FIELD OF THE INVENTION

The present invention relates to a steering arrangement for vehicles comprising a steering drive and a steering servo mechanism. The present invention is intended mainly to be applied to motor vehicles; it could, however, be advantageously used in connection with other vehicles, such as seafaring vehicles, if such vehicles are provided with a steering drive or gear having a steering servo mechanism including a steering translation gear.

BACKGROUND OF THE INVENTION

Considering the fact that the steering arrangement should make allowance for a manual adjustment of the direction of travel in case the servo mechanism falls out or becomes ineffective, it is of interest to use steering gears or drives having a large translation ratio and which are known to require small steering momenta. On the other hand, steering drives or gears having a large translation ratio have the disadvantage that only a considerable turning of the steering wheel could result in a certain angle of lock of the wheels. In the event of an emergency operation after the steering servo mechanism became defective, this should be given serious attention; however, it should not enter the consideration for driving under normal conditions with the steering servo mechanism operative.

It has been known from German Pat. Nos. 1,116,988 and 1,153,646, 63c-47, to place between a servo mechanism and the operating arrangement thereof a member, such as an amplifier, the output of which is inversely proportional to the vehicle velocity, or is a square thereof. In this known steering arrangement, however, there was no steering gear present; therefore, the problem of compensating the steering translation of such steering gear could not be present, which on the other hand is the problem with which the instant invention is concerned.

SUMMARY OF THE INVENTION

It is, therefore, an object of the present invention to provide a steering arrangement which enables the use of a steering gear having a large translating ratio and requiring small steering momentum without having the above described disadvantage which a steering servo mechanism is facing during operation.

In accordance with the present invention there is placed between the steering gear and the steering servo mechanism at least a member which, without changing the steering momentum, superimposes onto the steering translation or gear of the steering mechanism a further translation or gear ratio independent from the velocity of the vehicle.

The present invention provides that between the steering gear and the steering servo mechanism a member is placed the translation ratio of which is selected in such a manner that the steering translation of the steering gear becomes compensated to a desired extent.

According to the present invention the member receives a control magnitude which is a function of the vehicle velocity and has a translation ratio of $a + f(1/v)$, in which $a$ is the further translation ratio and "$f(1/v)$" is a function of the vehicle velocity.

The member employed according to the present invention in its preferred embodiment solves simultaneously two functions, namely similar to one of the above mentioned known arrangements, it delivers an operating magnitude to the steering servo mechanism that becomes smaller with increasing vehicle velocity and which, on the other hand, delivers a further operating magnitude to the steering servo mechanism that is independent of the forward or longitudinal velocity of the vehicle. This operating magnitude associated with the constant part $a$ of the translation of the member employed according to the present invention is selected in such a manner that the steering translation of the steering gear becomes fully or partially compensated. As a rule, only a partial compensation is selected, since a direct translation of the arrangement placed before the steering servo mechanism and consisting of the steering gear and the member used according to the present invention, as well as of further devices, is desirable only in relatively rare situations.

In another embodiment of the present invention, the member used is provided with a manually adjustable further translation ratio. In connection therewith the operator will have the possibility to adjust the translation ratio of the input circuit of the steering servo mechanism as he desires. For example, with this arrangement he can select in City traffic a different translation ratio than in the Thruway traffic.

An essential feature of the present invention resides in that the steering momentum — that is the force which the operator has to provide in order to attain a certain angle of lock of the motor vehicle wheels — remains unchanged. This has the advantage that the driving comfort or sensation remains constant, that is, the signals or sensations returned from the car wheels by means of the steering wheel remain at a constant magnitude.

Within the scope of the present invention there is also a steering arrangement according to which the member having a superimposed control magnitude and the member having manually adjustable features are arranged parallel with respect to each other; and their outputs are summed up by an addition member coupled in series to the steering servo mechanism. This adding member can be a conventional summing amplifier which, in a given case, can have an input for the delivery of a control magnitude to the input of the steering servo mechanism. The steering arrangement according to the present invention further offers the possibility that the steering servo mechanism may be a real aid to the operator in the event of intentional changes in the travelling direction, and also can function as a regulating or controlling circuit which, for example, automatically fully or partially compensates for the disturbing side effects creating a transverse movement of the vehicle.

When a manually adjustable member is used, the present invention offers a further possibility in that the steering translation ratio of the steering gear can be made adjustable.

BRIEF DESCRIPTION OF THE DRAWINGS

The invention will become more readily apparent from the following description of a preferred embodiment thereof shown, by way of example, in the accompanying drawings, in which.

DESCRIPTION OF THE PREFERRED EMBODIMENT

Figure 1:
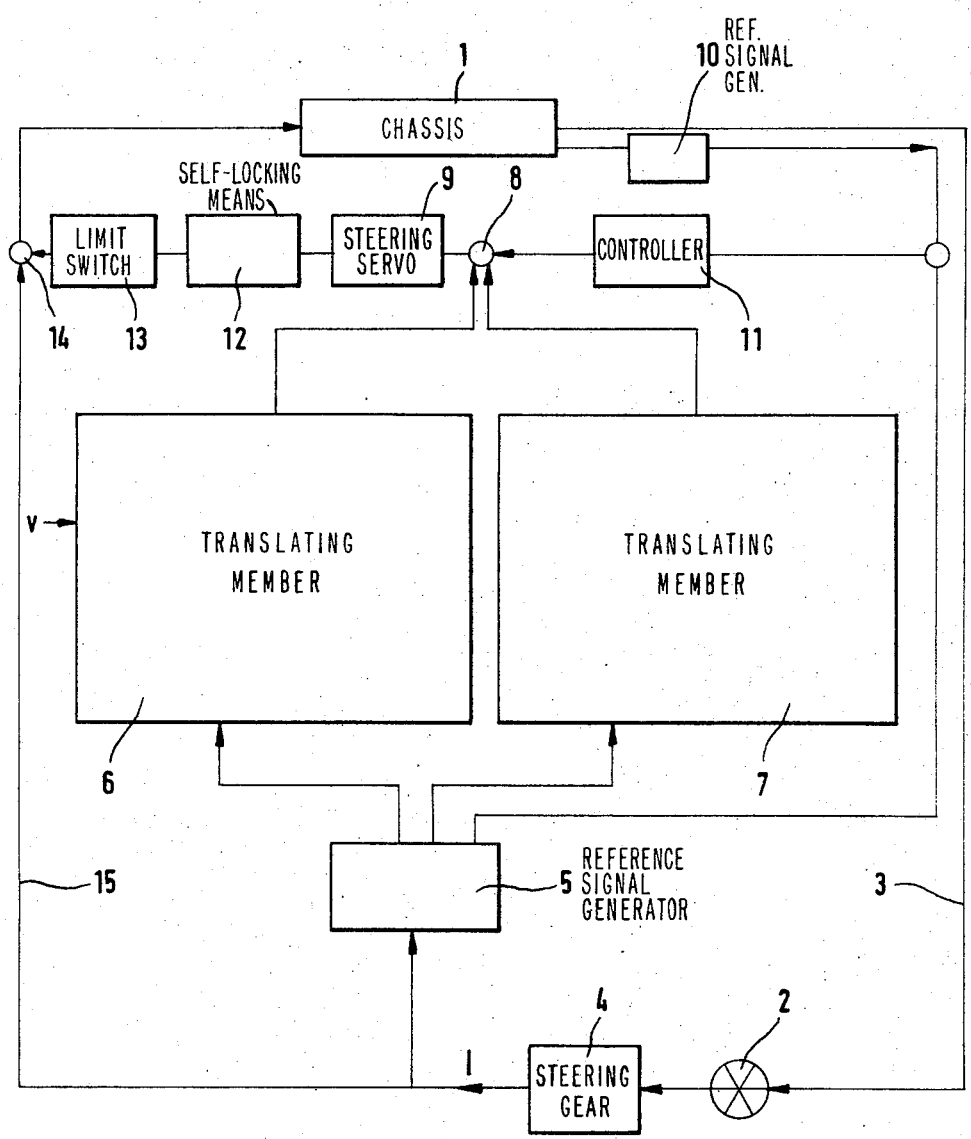
FIG. 1 is a block diagram of the steering arrangement according to the present invention.

With reference to FIG. 1 it is seen that the reference numeral 1 generally designates the chassis of a vehicle. In the following description it is assumed that the vehicle discussed is a motor vehicle. The operator sitting behind the steering wheel 2 receives information by means of the information path 3 about the conditions of travelling. Considering this information and also the desired course of the vehicle, the operator will deliver by means of the steering wheel 4 steering instruction 1' to a measuring or reference signal generator 5 which by means of parallel connected members 6 and 7 producing further translation and by means of a summing amplifier 8 is coupled with the input of a steering servo mechanism 9. While the so far described loop controls the steering servo mechanism 9 in dependence from the steering instructions 1' of the operator, the steering servo mechanism 9 forms also in the illustrated embodiment simultaneously a part of a control loop to compensate for the undesired cross or transverse movements of the vehicle. This latter control loop comprises as an essential element the additional measuring or reference signal generator 10 which delivers control signals corresponding to the undesired transverse movements of the vehicle onto a regulator or controller 11 which, in turn, delivers a control magnitude to the summing aplifier 8. This control magnitude or signal can be proportioned in such a manner that, for example, by feeding the signals corresponding to the driving instruction 1' at one input of the controller 11, a control magnitude on the summing amplifier 8 becomes available only when the transverse effects measured or sensed by the measuring reference signal generator 10 are created by disturbing forces and not by driving instructions.

The steering servo mechanism 9 operates through a self-locking device 12 which can be in the form of a self-locking worm gear, and through a limit switch 13 on the coupling member or coupling log 14 formed as an adding or summing member. The self-locking takes care that the signals coming from the vehicle side 1 cannot run into the steering servo mechanism 9 while instructions coming from the steering servo mechanism 9 in the direction of the vehicle can be given. The limit switch 13 breaks the loop or the operating circuit for the steering, for example, when exceedingly large control instructions are given or if there is a defect in the arrangement.

As can be seen in the figures, the operating instructions 1' are delivered over the instruction path 15 which runs parallel with the above described arrangement, also to the coupling or summing member 14. Therefore, it is possible to steer a vehicle even when the limit switch 13 becomes operational, and in addition, the operating instructions coming from different directions from the steering servo mechanism 9 as well as the operating directions 1' coming from the operator can cause the retention of the control by the operator even if the steering servo is operational.

Essential elements of the steering arrangement according to the present invention are, as mentioned above, the parallel lying members 6 and 7. Considering first the member 6, it is constructed in such a manner that it causes a translation of signals lying at its input with respect to signals lying at the input of the summing amplifier 8. The signals consist of a component $a$ independent of the velocity and a component which depends from the velocity of the vehicle in such a manner that the last mentioned component becomes smaller with respect to increasing velocities of the vehicle. Inasmuch as the translation ratio of the steering drive remains unchanged, the steering momentum remains also unchanged.

Figure 2:
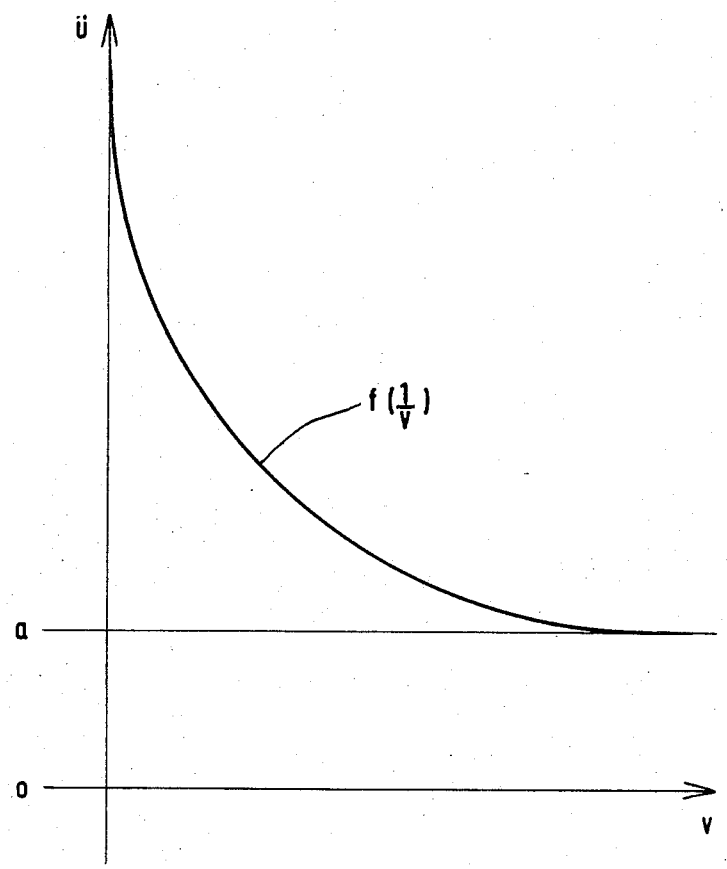
FIG. 2 is a graphical representation of the function of the arrangement according to the present invention.

Considering now the diagram illustrated in FIG. 2, it is seen that both components of the translating ratio $ü$ of the member 6 are plotted over the control magnitude $v$ depending from the velocity in the longitudinal direction of the vehicle and which is fed to the member 6. While during the failure to translate the magnitude $a$ without dependence from the velocity, the velocity dependent component $f(1/v)$ at large velocities and thereby at large values of $v$ would cross the abscissa ($ü = 0$), this crossing will occur into the line $ü - a$. The constant component $a$ of the translation ratio of the member 6 is selected in such a manner that the overall translation ratio between the input of the steering drive 4 and the input of the steering servo mechanism 9 will not exceed a desired value (or will not fall below such value), irrespective of the fact that the sterring drive 4 operates with a small steering momentum and thereby with a large translation ratio.

While the member 6 is controlled automatically by the control magnitude $v$, the member 7 provides for a change of the translating ratio of the path from the input of the steering drive 4 to the input of the steering servo mechamism 9. Such manual adjustment may play a role, for example, when the steering drive 4 requires differently large translation ratios and thereby differently large steering momenta.

The members 6 and 7 capable of producing further translation can be constructed in the form of control apparatus described in the following literature to which reference should be had:

a. "Operationsverstaerker und ihre Schaltungstechnik." Author: Dipl.-Ing. W. Schaufelberger, 4th edition, published by: Kontron GmbH & Co. KG, Munchen, West Germany; pages 11, 14, 16.

b. "Operationsverstaerker, Theoretische Grundlagen und Anwendungsbeispiele." Author: Dieter Bendisch, 1969 published by: Alfred Neye, Enatechnik, Hamburg-Quickborn, West Germany; pages 7 and following, 59.

c. "Linear Integrated Circuits." Author: Radio Corporation of America, published by: Alfred Neye, Enatechnik; pages 75 and following, 235 and following.

Figure 3:
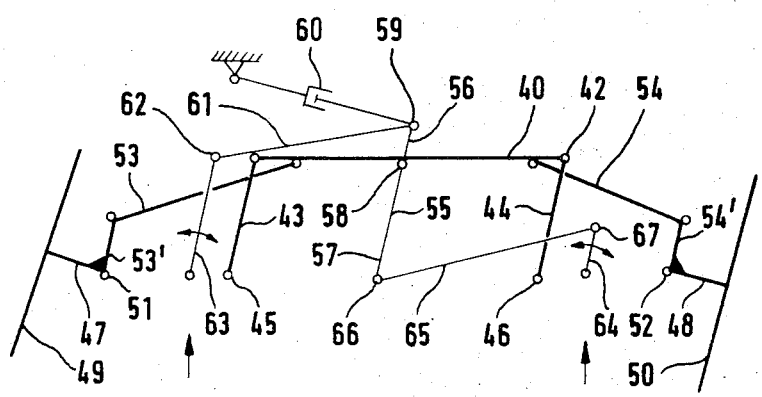
FIG. 3 is a further embodiment of the present invention illustrating the addition member which can also be represented by means of a planetary drive.

FIG. 3 shows an embodiment for the coupling member identified by the reference numeral 14 in FIG. 1.

Here practically a mechanical addition circuit is contemplated. The solid lines represent those parts which are known to be used in available steering arrangement without control. A special advantage of the third coupling member illustrated in the embodiment shown in FIG. 3 can be seen therein that a steering geometry of the known arrangement has been retained. Also in the arrangement shown in FIG. 3, the cross tie 40 is guided over linkage-like connections 41 and 42 over levers 43 and 44 in a parallel manner; the levers as shown at 45 and 46 are tiltably supported. As in the known arrangements, the axles 47 and 48 of the wheels 49 and 50 are tiltably mounted by means of axle shank bolts 51 and 52 about the vertical axes. The tilting motion by means of levers 53 and 54 the ends of which are pivotably or tiltably coupled to the cross tie 40, and by means of levers 53' and 54' which are fixedly coupled to the axles 47 and 48, is translated onto the axles 47 and 48.

While the steering forces exerted by the steering gear are usually led into the lever 43, in the embodiment illustrated in FIG. 3 an additional lever arrangement is provided into which the positioning magnitudes obtained from the control magnitude by the steering servo mechanism are also led simultaneously to such additional lever arrangement. The latter comprises as an essential element an adding lever 55 which is constructed as a two-arm lever. Each of the arms 56 and 57 extends from the rotational coupling 58 with the cross tie 40 to one of the two levers. The upper lever, as shown in the figure, carries a bearing 59 permitting the relative rotation and serving as the bearing for the oscillation damper 60, and a lever 61 which at 62 is also connected with a lever 63 in a rotating fashion. Into the lever 63 are fed the forces corresponding to the driving instructions of the operator and delivered from the steering gear. In the illustrated embodiment it has been assumed that these forces are fed as rotational forces which cause an angular shift of the lever 63 according to the two-directional arrow indiated in the drawing.

The same is true for the feeding of the positioning magnitude into the additional lever arrangement. Such feeding occurs on the lever 64 which over a pivotably or tiltably coupled lever 65 is in connection with a linkage joint 66 at the lower end of the adding lever 55, as seen in FIG. 3. Both levers 63 and 64 serving for the introduction of the forces are journaled on their free ends.

Considering now the operation of the above described arrangement, it is assumed that at the beginning of the input of the summing amplifier 8 there is no input magnitude so that no forces are fed into the lever 64; and if the operator gives driving or steering instructions, a positioning of the illustrated arrangement occurs only by the tilting or pivoting of the lever 63, for example, in clockwise direction. As a result the bearing 67 on the upper end of the lever 64 remains in its place and the bearing 59 undergoes pivoting or tilting motions. Under these conditions the cross tie 40 by means of the rotating coupling 58 is carried from left to right, as seen in the figure, for a certain path depending on the dimensions of the two lever arms 56 and 57. The parallel motion of the cross tie 40 occurs under this condition in such a manner that the bearing points 41 and 42 move over a circular path about the bearing 45 and 46. The result of all this will be, as seen in the figure, a turning of the wheels in the direction to the right.

Considering now the additional lever arrangement, it will be seen that practically an opposite effect takes place when a force is fed into the lever 64 only from the control loop. Now the location of the joint 62 is retained and now the cross tie 40 will be shifted to the right in the figure.

The invention offers the possibility that at low velocities or speeds the same turning of the wheel or the same angle of lock of the wheel can be attained with a smaller steering turning than at higher speeds and at the same time the steering momentum remains unchanged, that is, the travelling sensation or driving sensation remain the same. These advantages occur also when a control device is present for the compensation of disturbing transverse accelerations of the vehicle.

The steering arrangement according to the present invention can operate mechanically, electrically, hydraulically or pneumatically.

From the above it is apparent that although the invention has been described hereinbefore with respect to a certain specific embodiment thereof, it is evident that many modifications and changes may be made without departing from the spirit of the invention. Accordingly, by the appended claims, I intend to cover all such modifications and changes as fall within the true spirit and scope of this invention.

Having thus described the invention, what I claim as new and desire to be secured by Letters Patent, is as follows:

1. A steering arrangement for vehicles having a steering wheel, comprising a steering gear having an input and output shaft, said input shaft being operatively connected to said steering wheel, a coupling member having a first input operatively connected to said output shaft for receiving first steering signals therefrom, said steering gear having a translation ratio for steering instructions received from said steering wheel defining a steering momentum at said steering wheel, and a steering servo mechanism having input and output, means coupled between the output shaft of said steering gear and the input of said servo mechanism and having a further translation ratio at least a component of which is independent from the velocity of the vehicle and at least partly compensating for the steering translation ratio of the steering gear, said coupling member having a second input, the output of said steering servo mechanism delivering second steering signals to said second input of said coupling member, said coupling member being an adding member for delivering output signals corresponding to the sum of said first and second steering signals, the output of said coupling member being operatively connected to the chassis of the vehicle.

2. The steering arrangement as claimed in claim 1, wherein said means receives a control input signal $v$ depending from the velocity of the vehicle and produces a translation ratio of $a + f(1/v)$ wherein $a$ is the further or additional translation ratio component and $f(1/v)$ is a function of the vehicle speed.

3. The steering arrangement as claimed in claim 2, wherein a means receiving a manually adjustable further translation ratio is provided.

4. The steering arrangement as claimed in claim 3, wherein said means having said control input and said means having the manually adjustable translation ratio are arranged parallel with respect to each other and each having an output means, said output means being coupled into an adding member connected to input of said steering servo mechanism.

5. The steering arrangement as claimed in claim 4, wherein said adding member comprises a further input for the receiving of a control magnitude, a regulator means, said further input being connected to said regulator means.

6. The steering arrangement as claimed in claim 1, wherein the steering translation ratio of the steering gear is variable.

7. In a motor vehicle having a steering wheel, a steering arrangement comprising a steering gear having an input and output shaft, said input shaft being operatively connected to said steering wheel, a coupling member having a first input operatively connected to said output shaft for receiving first steering signals therefrom, said steering gear having a translation ratio for steering instructions received from said steering wheel, defining a steering momentum at said steering wheel, and a steering servo mechanism having input and output, means coupled between the output shaft of said steering gear and the input of said servo mechanism and having a further translation ratio at least a component of which is independent from the velocity of the vehicle and at least partially compensating for the steering translation ratio of the steering gear, said coupling member having a second input, the output of said steering servo mechanism delivering second steering signals to said second input of said coupling member, said coupling member being an adding member for delivering output signals corresponding to the sum of said first and second steering signals, the output of said coupling member being operatively connected to the chassis of the vehicle.

8. The combination as claimed in claim 7, wherein said means receives a control input signal $v$ depending from the velocity of the vehicle and produces a translation ratio of $a + f(1/v)$ wherein a is the further or additional translation ratio component and $f(1/v)$ is a function of the vehicle speed.

9. The combination as claimed in claim 8, including further a means receiving a manually adjustable further translation ratio.

10. The combination as claimed in claim 9, wherein said means having said control input and said means having the manually adjustable translation ratio are arranged parallel with respect to each other and each having an output means, said output means being coupled into an adding member connected to the input of said steering servo mechanism.

11. The combination as claimed in claim 10, wherein said adding member comprises a further input for the receiving of a control magnitude, a regulator means, said further input being connected to said regulator means.

12. The combination as claimed in claim 7, wherein the steering translation ratio of the steering gear is variable.

* * * * *